(12) United States Patent
Stapulionis et al.

(10) Patent No.: US 7,731,465 B2
(45) Date of Patent: Jun. 8, 2010

(54) RELEASE PIN

(75) Inventors: Sean A. Stapulionis, South Russell, OH (US); James C. Klingenberg, Concord, OH (US); David Craig Hageman, Chagrin Falls, OH (US)

(73) Assignee: Jergens, Inc., Cleveland, OH (US)

( * ) Notice: Subject to any disclaimer, the term of this patent is extended or adjusted under 35 U.S.C. 154(b) by 242 days.

(21) Appl. No.: 11/480,132

(22) Filed: Jun. 30, 2006

(65) Prior Publication Data

US 2007/0003391 A1  Jan. 4, 2007

Related U.S. Application Data

(60) Provisional application No. 60/696,420, filed on Jul. 1, 2005.

(51) Int. Cl.
 *F16B 21/00* (2006.01)
(52) U.S. Cl. .................. 411/348; 411/337; 411/347; 292/9; 292/252; 292/DIG. 37
(58) Field of Classification Search .............. 411/337, 411/347–348; 292/9, 252, DIG. 37
See application file for complete search history.

(56) References Cited

U.S. PATENT DOCUMENTS

| | | | | |
|---|---|---|---|---|
| 2,123,935 A * | 7/1938 | Dole | ............... | 411/348 |
| 2,313,883 A * | 3/1943 | Lowther | ............... | 269/48.4 |
| 2,352,414 A * | 6/1944 | Spooner | ............... | 411/348 |
| 2,368,713 A * | 2/1945 | Kane | ............... | 411/552 |
| 2,373,083 A * | 4/1945 | Brewster | ............... | 411/348 |
| 2,779,228 A * | 1/1957 | Meepos et al. | ............... | 411/348 |
| 2,786,383 A * | 3/1957 | Bachman | ............... | 411/348 |
| 2,797,464 A * | 7/1957 | Zahodiakin | ............... | 411/552 |
| 2,873,007 A * | 2/1959 | Francis | ............... | 403/42 |
| 2,884,677 A * | 5/1959 | Zahodiakin | ............... | 411/552 |
| 2,893,788 A * | 7/1959 | Yerian | ............... | 305/202 |
| 2,901,804 A * | 9/1959 | Williams | ............... | 411/348 |
| 3,046,629 A * | 7/1962 | Malesko | ............... | 411/555 |
| 3,117,484 A * | 1/1964 | Myers | ............... | 411/348 |
| 3,200,690 A * | 8/1965 | Dickman | ............... | 411/337 |
| 3,227,029 A * | 1/1966 | Devine et al. | ............... | 411/337 |
| 3,494,504 A * | 2/1970 | Jackson | ............... | 220/237 |
| 3,614,799 A * | 10/1971 | Gulistan | ............... | 470/50 |
| 4,619,569 A * | 10/1986 | Wright | ............... | 411/347 |
| 5,207,544 A * | 5/1993 | Yamamoto et al. | ............... | 411/348 |
| 5,394,594 A | 3/1995 | Duran | | |
| 5,452,979 A * | 9/1995 | Cosenza | ............... | 411/348 |
| 2003/0121548 A1 * | 7/2003 | Giordano | ............... | 137/505 |

\* cited by examiner

*Primary Examiner*—Victor Batson
*Assistant Examiner*—Roberta Delisle
(74) *Attorney, Agent, or Firm*—Rankin, Hill & Clark LLP

(57) ABSTRACT

A releasable locking device has a housing and an elongated member extending from the housing. The elongated member has an opening extending therethrough. A shaft extends through the opening of the elongated member. An actuator member extends from an end of the shaft and is positioned within an opening of the housing. A biasing member is positioned between the actuator member and a wall of the housing and is completely within an opening of the housing and not in the elongated member.

19 Claims, 3 Drawing Sheets

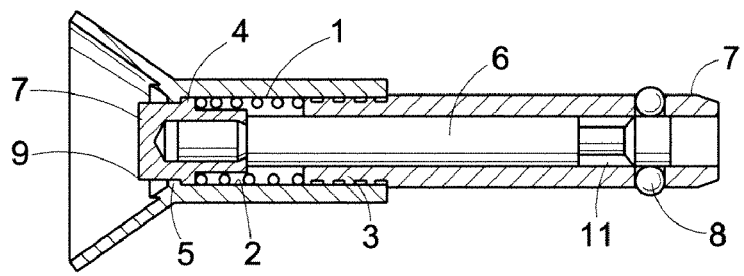
FIG. 1 (PRIOR ART)
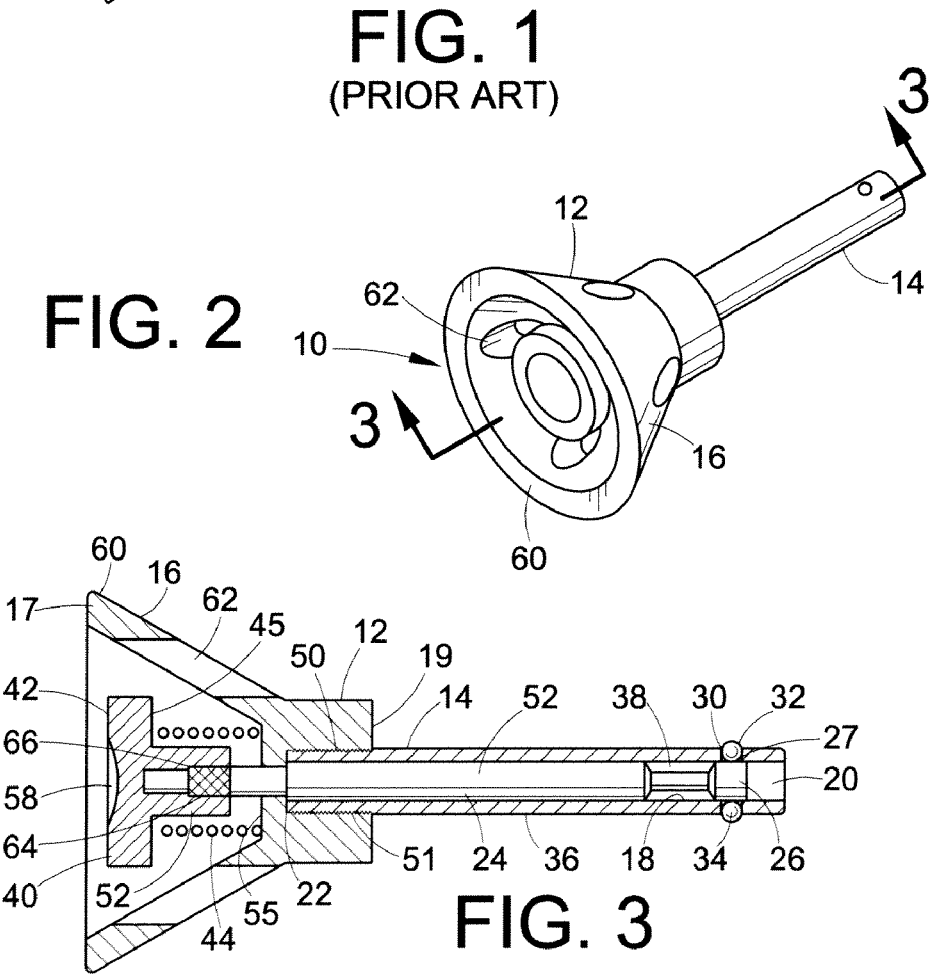
FIG. 2
FIG. 3
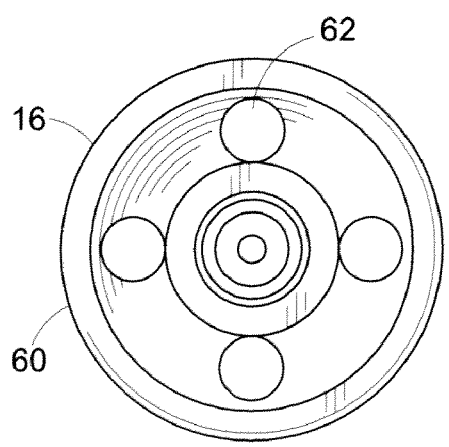
FIG. 4

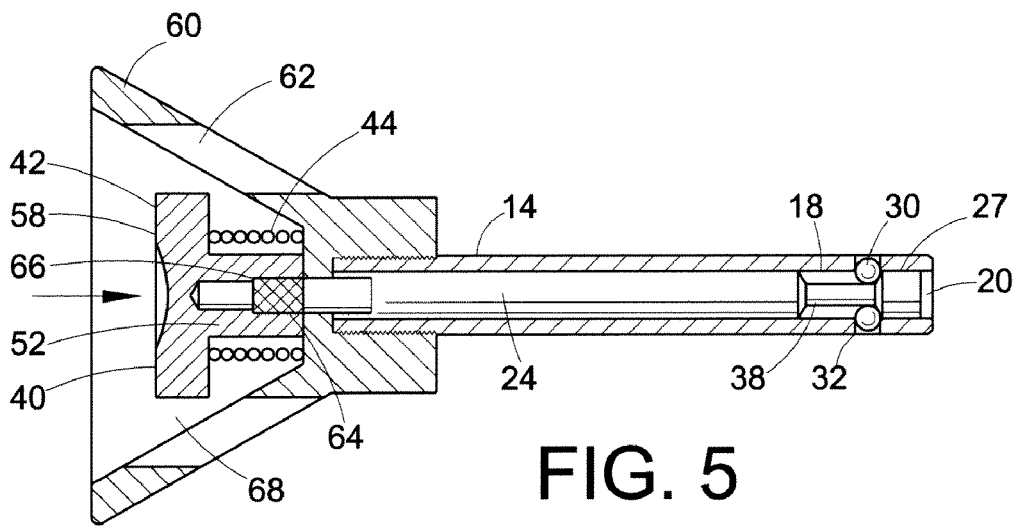
FIG. 5
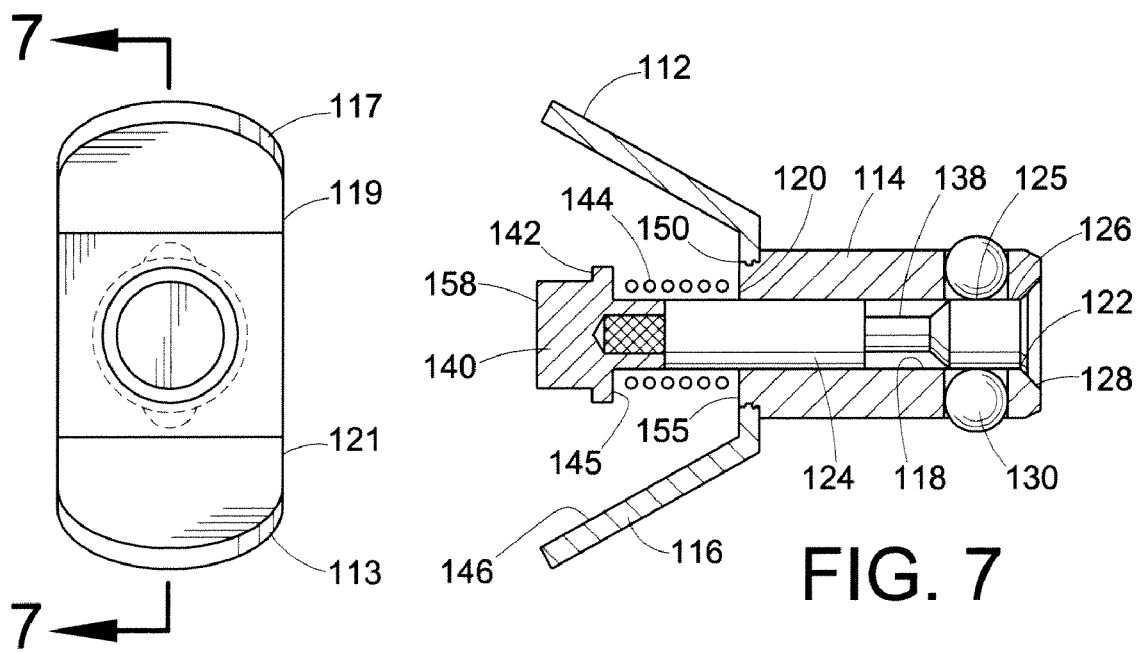
FIG. 6
FIG. 7
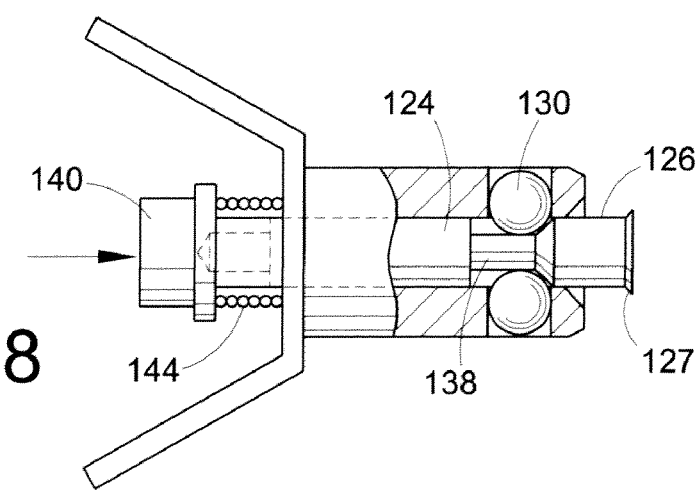
FIG. 8

RELEASE PIN

CLAIM OF PRIORITY

This application claims priority from provisional application Ser. No. 60/696,420 filed on Jul. 1, 2005, which is hereby incorporated by reference.

BACKGROUND

This invention relates to release pins. Releasable securing devices, such as ball pins, are commonly used for joining the parts of industrial fixtures releasably together. Such ball pins have a hollow, hardened stem inserted through mating bores in the parts to be joined, the stem terminating in an abutment surface to be pressed against the top side of the parts; and depressible or retractable ball detents near the tip of the pin, to engage the parts on their bottom side.

Quick connect ball locking devices generally include a plurality of detents, such as balls, trapped within a tube but protruding out openings therein. A ball actuator is reciprocal within the tube and movable from a first position wherein the balls are retracted substantially within the tube or moved outwardly a sufficient distance to lock the balls within a mating receptacle. An example of such a ball locking device is shown in U.S. Pat. No. 5,394,594 which is incorporated by reference herein.

Referring in particular to FIG. 1, in previous fastener devices, a compression spring 1 is mounted within an enlarged bore 2 at one end of the pin shank 3 and this spring normally holds a shoulder 4 on the spindle 6 against an abutment 5 on the pin shank. In this position of the parts the land 6 hold the balls 8 in a projected position. An actuator button 9 on the shank may be moved manually to bring a groove 11 into registry with the balls and thereby permit inward movement of the balls to a release position.

A problem with these existing release pins is that the springs are captured within a bore of the pin shank and are not easily accessible from outside of the release pin. Thus it is difficult to change the size of the spring without also changing the cavity size of the pin. A spring being positioned outside of the cavity allows the release pin to be easily reloaded, and also increases the strength of the release pin.

Furthermore, existing release pin designs do not have holes or slots for receiving ropes or lanyards to keep the pin attached to the device it is being used with, or to a wall or other support surface. Thus, there is a need for providing holes on the release pin for lanyards so that when the pin is pulled out of engagement, it stays attached by the lanyard connection.

Thus, it is desirable to develop a new and improved release pin which has an easily replaceable spring which overcomes the above-mentioned deficiencies and others and produces advantageous overall results.

SUMMARY OF THE INVENTION

One of the objects of the present invention is to improve such releasable securing devices by making their length adjustable, to assure a precise tight fit, and to secure a wide range of adjustment whereby to minimize the number of lengths of such securing devices which must be carried in stock.

This invention relates to fastener devices and is particularly directed to quick release pin assemblies. Devices of this type employ a spindle movable axially within a longitudinal bore in the shank of a pin. Movement of the spindle acts to cause radial movement of balls outward beyond the outer surface of the pin shank to form a projecting abutment. One or more land portions on the movable spindle holds the balls in a projected position, while a groove in the spindle permits the balls to be moved radially inwardly so that they do not project beyond the outer surface of the shank. The release pin of the present invention has a spring which is mounted within a housing outside of a shank and is easily accessible to be replaced and installed. Various lengths and strengths of springs can be used with the release pin with minimal assembly time required.

Slots or holes are provided on a housing to enable lanyards or rope to be secured to the release pin so that it remains attached to a wall or other support surface when removed from the object with which it is being used. The release pin can be used in a wide variety of applications, including in hospitals with drip bags, in military applications, etc.

Thus, in accordance with one aspect of the present invention, a releasable locking device has a housing and an elongated member extending from the housing. The elongated member has an opening extending therethrough. A shaft extends through the opening of the elongated member. An actuator member extends from an end of the shaft and is positioned within an opening of the housing. A biasing member is positioned between the actuator member and a wall of the housing.

In accordance with another aspect of the present invention, a releasable locking device has a handle with first and second portions and a shank extending from the handle. The shank has an opening extending therethrough. A shaft extends through the opening of the shank. An actuator member extends from an end of the shaft and is positioned between the first and second portions of the handle. A biasing member is positioned between the actuator member and a wall of the handle.

In accordance with yet another aspect of the invention, a releasable locking device has a housing with first and second portions and a shank extending from the housing. The shank has an opening extending therethrough. A shaft extends through the opening of the shank. An actuator member extends from an end of the shaft and is positioned within an opening of the housing. A biasing member is positioned between the first and second portions of the housing.

One aspect of the present invention is the provision of a release pin having a compression spring located outside of the bore of the shank to allow easy access to the spring for replacement.

Another aspect of the invention is the provision of providing holes in the housing so that lanyards or ropes can be attached to the release pin to keep the pin attached to the device with which it is being used.

Still other aspects of the present invention will become apparent after a reading of the following detailed description of the embodiments.

BRIEF DESCRIPTION OF THE DRAWINGS

Further aspects of the invention will become apparent by reference to the detailed description when considered in conjunction with the figures, wherein like reference numbers indicate like elements through the several views, and wherein:

FIG. 1 is a side elevational view in cross-section of an existing release pin;

FIG. 2 is a perspective view of a release pin in accordance with an embodiment of the present invention;

FIG. 3 is a side elevational view in cross-section of the release pin of FIG. 2 in a locked position;

FIG. 4 is a front elevational view of the release pin of FIG. 2;

FIG. 5 is a side elevational view in cross-section of the release pin of FIG. 2 in an unlocked position;

FIG. 6 is a front elevational view of a release pin in accordance with a second embodiment of the present invention;

FIG. 7 is a side elevational view in cross-section of the release pin of FIG. 6 in a locked position;

FIG. 8 is a side elevational view in partial cross-section of the release pin of FIG. 6 in an unlocked position.

DETAILED DESCRIPTION

Figure 9A:
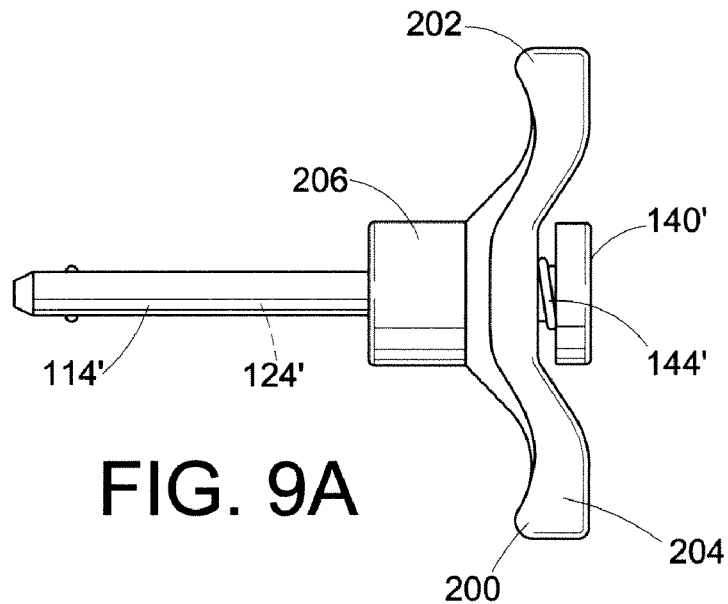
FIGS. 9A-9C show an alternative embodiment of the release pin including a side elevational view, a front elevational view and perspective view of the pin assembly.

Referring now to the drawings, in particular FIGS. 2 and 3, a quick release pin assembly 10 in accordance with the present invention includes a pin member 12 having a shank 14 and a housing 16. The housing has a substantially truncated cone-shaped portion 17 and a cylindrical portion 19 extending therefrom. The shank has a central axial bore 18 open at one end 20 and terminating at a shoulder 22 formed within housing 16. A shaft 24 is mounted within the bore 18 for axial sliding movement and a spindle 26 formed at an end of the shaft constitutes a land or edge 27 which serves to hold a pair of radially movable balls 30 in their fully projected position. The balls are about 180 degrees apart. That is, the balls move radially in lateral bores 32 in shank 14. The outer ends of the bores 32 can be "staked" to reduce the size of the openings 34 which intersect the outer cylindrical surface 36 of the shank 14, and this reduced size opening retains each ball from laterally escaping. When the shaft 24 is moved axially to bring a spindle groove 38 into alignment with the balls, the balls 30 move radially inwardly so that they do not extend beyond the outer surface 36 of the shank.

An actuator button or knob 40 is fixed to the shaft in a manner described below and the button has a flange 42 which is engaged by a compression spring 44 on an underside 45 of the flange mounted within the enlarged opening 46 of the housing 16. One end of the spring 44 engages a housing surface 55 of the truncated cone-shaped portion and the other end engages underside 45 of the flange 42 of the actuator knob. The spring is completely outside of the shank and can be easily removed and replaced with springs of different lengths and strengths. In FIG. 3, the spring is shown in an extended or non-compressed position and the balls are in bores 32 of shank 14. This is the locked position of the release pin.

The housing is fixed to the shank by any convenient means such as, for example by press fit, brazing, swaging or screw threading. In the particular connection illustrated in the drawings, the shank and housing are connected by means of the threaded fit along the surfaces 50, 51. Cylindrical portion 52 of the actuator knob abuts surface 55 of the housing bore 46 when the knob is depressed as shown in FIG. 5. When an exposed end surface 58 of the actuator knob is manually depressed to compress the spring 44, the "land" portion 27 of the spindle moves along the central axial bore 18 and allows the balls to drop into engagement with the spindle groove 38 and fall out of the openings 34 of the shank. This is the unlocked position of the release pin. Laterally extending wall 60 of the housing 16 can be of various shapes or designs to provide a surface or handle for engagement by fingers of the operator.

Referring to FIGS. 2, 3 and 4, a plurality of openings or slots 62 are formed on wall 60 of the housing. The slots are used to secure the release pin to a lanyard or rope (not shown) so that the release pin is secured to the device it is being used with or to a wall or other support surface. Thus, when the release pin is removed from the device it is securing, it is not loose and can be easily retrieved for re-use.

In accordance with the present invention, the shaft is formed of solid cylindrical material such as metal or steel and one end 64 is received within a bore 66 in the actuator button. The shaft may be manufactured in large quantities and cut to the proper length just prior to assembly. After inserting the end of the shaft into the bore of the actuator button a swaging tool (not shown) is brought into engagement with a portion of the actuator button to permanently attach the actuator button to the shaft.

The shaft, actuator button, balls, spring and spindle are then assembled with respect to the housing 16 in the manner shown in FIG. 3. The surfaces 50, 51 are connected together to form a permanent connection between the housing and the shank. Spring 44 is positioned entirely within the opening or cavity 68 of the housing between the housing and button so that the spring can be easily replaced by other springs or various lengths and/or strengths. Since the spring is not actually enclosed in a bore of the housing cylindrical section as shown in the prior art of FIG. 1, it is easily removable without disassembly of the entire pin structure.

Referring now to FIGS. 6, 7 and 8, an alternate embodiment of the release pin is shown. Pin member 112 has a shank 114 and a housing 116. The shank has a central bore 118 open at opposite ends 120, 122. A shaft 124 is mounted within the bore for axial sliding movement therein. An end portion 125 of a spindle 126 acts as a "land" which serves to hold a pair of radially movable balls 130 in their fully projected position. A groove 138 of the shaft allows the balls to drop from their projected position when the shaft moves axially along the central bore 118 of the shank. The end of the spindle has a ramped edge 127 which engages a corresponding ramped edge 128 of the shank 114.

An actuator button or knob 140 is fixed to the spindle and has a flange 142 which is engaged on an underside 145 by a spring 144 which is positioned within opening 146 of housing 116. Spring 144 is extended in the locked position shown in FIG. 7. When the button 140 is depressed, the spring compresses and the balls drop from openings in the shank in the unlocked position.

The housing 116 for the button 140 has two portions 117, 113 having arcuate shapes and having straight edges or portions 119, 121 which are angled and adjacent an end surface 155 of the shank 114. The arcuate portions and linear portions provide easy access to both the spring and the button 140 for both depressing the button and for removing and/or replacing the spring. The housing can serve as a handle for manually gripping the release pin. One end of the spring 144 engages surface 155 and the other end engages the underside 145 of flange 142. The spring can be easily removed from the housing without complete disassembly of the pin.

The housing is fixed to the shank via any convenient means, such as by press fit, brazing, swaging or screw threading. FIG. 7 illustrates a screw thread engagement at surfaces 150.

As shown in FIG. 7, the shank and shaft are shown to be of a relatively short length as compared to the shank illustrated in FIG. 5. However, various lengths and diameters of the shaft and shank can be used without departing from the scope of the invention.

Figure 9B:
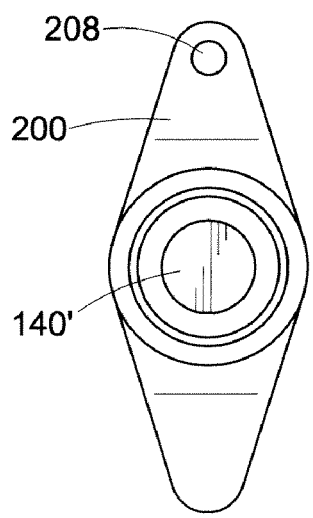
Figure 9C:
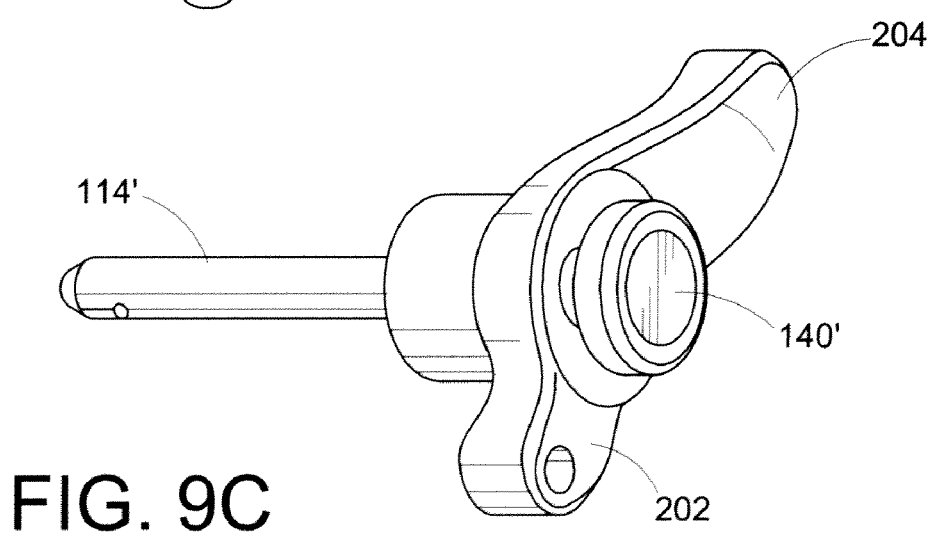

FIGS. 9A-9C illustrate yet another alternative embodiment of the release pin and associated housing. The shank 114' and shaft 124' and compression spring 144' and knob 140' are the same as described for FIGS. 6-8 and are not discussed in detail here.

The handle 200 has two arcuate-shaped portions 202, 204 which are curved to serve as gripping members for manually gripping the handle. A cylindrical portion 206 is formed on the handle from which shank 114' extends. A pair of balls 130' extends through openings in the shank.

An opening or throughhole 208 is formed in the handle for allowing the release pin to be secured by a lanyard, rope, etc. to a device with which it is being used.

When an exposed portion of the actuator is manually depressed to compress the spring 144', the land portion of the spindle moves along the central axial bore of the shank and away from the position adjacent the balls and allows the balls to drop into engagement with a spindle groove. This is the unlocked position of the release pin.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the embodiments described above.

The invention claimed is:

1. A releasable locking device, comprising:
    a housing comprising an arcuate wall having an opening therein and a cylindrical portion having an opening therein, said cylindrical portion extends from the arcuate wall along a longitudinal axis of said housing;
    an elongated member connected to and extending from said housing; said elongated member having an opening extending therethrough;
    a shaft extending through said opening of said elongated member and along said longitudinal axis of said housing;
    an actuator member extending from an end of said shaft and positioned entirely within the confines of said arcuate wall, said actuator knob is actuated entirely within the confines of the arcuate wall; and
    a biasing member extending along said longitudinal axis of said housing and positioned between said actuator member and said cylindrical portion of said housing and positioned entirely within the confines of said arcuate wall and entirely outside of cylindrical portion of said housing.

2. The releasable locking device of claim 1, further comprising a spindle formed at an end of said shaft.

3. The releasable locking device of claim 1, further comprising at least one ball which is positioned within a groove formed in said elongated member.

4. The releasable locking device of claim 3, wherein said at least one ball moves radially into at least one bore formed on an outer surface of said elongated member.

5. The releasable locking device of claim 1, wherein said housing comprises a substantially truncated cone-shaped section having an opening therein and a cylindrical section.

6. The releasable locking device of claim 5, wherein said biasing member comprises a compression spring interposed between a wall of said truncated cone-shaped section of said housing and a flange of said actuator member.

7. The releasable locking device of claim 1, wherein said actuator member comprises a knob.

8. The releasable locking device of claim 7, wherein said housing is attached to said elongated member via a threaded connection.

9. The releasable locking device of claim 6, wherein said biasing member is in an extended position between said actuator member and said housing wall when said actuator member is not depressed.

10. The releasable locking device of claim 1, wherein said biasing member is in a compressed position when said actuator member is manually depressed.

11. The releasable locking device of claim 4, wherein said shaft moves axially along said opening of said elongated member until said at least one ball radially extends into said bore of said elongated member.

12. The releasable locking device of claim 3, wherein said at least ball comprises a pair of balls positioned substantially 180 degrees apart.

13. The releasable locking device of claim 5, wherein said biasing member is positioned entirely within said opening of said truncated cone-shaped portion of said housing.

14. The releasable locking device of claim 5, wherein said truncated cone-shaped section of said housing comprises a wall having at least one opening therethrough for receiving a lanyard.

15. A releasable locking device, comprising:
    a housing comprising a truncated cone portion and a cylindrical portions, said cylindrical portion extends from the truncated cone portion along a longitudinal axis of said housing;
    a shank extending from an opening of said cylindrical portion of said housing; said
    shank having an opening extending therethrough;
    a shaft extending through said opening of said shank;
    an actuator knob extending from an end of said shaft and positioned entirely within the confines formed by said truncated cone portion of said housing, said actuator knob is actuated entirely within the confines of the truncated cone; and
    a biasing member positioned entirely within the confines formed by said truncated cone portion and entirely outside of said cylindrical portion for biasing said actuator knob.

16. The releasable locking device of claim 15, wherein said actuator knob comprises a flange, wherein said biasing member extends between said flange and a wall of said shank.

17. The releasable locking device of claim 15, wherein said biasing member comprises a spring.

18. The releasable locking device of claim 15, wherein at least one of said truncated cone and said cylindrical portions of said handle comprise a pair of arcuate-shaped gripping portions.

19. The releasable locking device of claim 15, wherein said housing comprises an opening for receiving a lanyard.

* * * * *

UNITED STATES PATENT AND TRADEMARK OFFICE
CERTIFICATE OF CORRECTION

PATENT NO. : 7,731,465 B2
APPLICATION NO. : 11/480132
DATED : June 8, 2010
INVENTOR(S) : Sean A. Stapulionis et al.

It is certified that error appears in the above-identified patent and that said Letters Patent is hereby corrected as shown below:

In Column 6, Line 31 (Claim 15, Line 3), delete "portions" and insert --portion--.

Signed and Sealed this
Twenty-second Day of February, 2011

David J. Kappos
*Director of the United States Patent and Trademark Office*